United States Patent [19]

Showers, Jr.

[11] 4,140,091
[45] Feb. 20, 1979

[54] UNIFORM COMPRESSION PISTON ENGINE

[76] Inventor: Lewis M. Showers, Jr., Rte. #4, Box 377, Schoolhouse La., Glen Mills, Pa. 19342

[21] Appl. No.: 775,724

[22] Filed: Mar. 9, 1977

[51] Int. Cl.² ............................................. F02B 75/04
[52] U.S. Cl. ............................... 123/78 E; 123/71 BA
[58] Field of Search ............... 123/48 B, 78 BA, 78 E

[56] References Cited

U.S. PATENT DOCUMENTS

| | | | |
|---|---|---|---|
| 1,539,769 | 5/1925 | Paillon | 123/78 E |
| 1,610,137 | 12/1926 | Kratsch | 123/78 E |
| 1,637,245 | 7/1927 | Scully | 123/78 E |
| 2,134,995 | 11/1938 | Anderson | 123/48 B |
| 2,248,323 | 7/1941 | Anthony | 123/78 E |
| 2,252,153 | 8/1941 | Anthony | 123/78 E |

*Primary Examiner*—Charles J. Myhre
*Assistant Examiner*—David D. Reynolds

[57] ABSTRACT

This device pertains to an automatically adjustable length connecting rod, as applied to each cylinder of an internal combustion engine designed to operate at variable speed and torque outputs.

The purpose of the adjustable length connecting rod is to substantially maintain the level of compression of the fuel mixture over a wide range of speed and torque requirements by means of varying the compression ratio.

Automatic adjustment and locking of the length of the connecting rod is accomplished by means of a hydraulic cylinder within the connecting rod. Pressure is applied during a suitable portion of the intake stroke to lengthen the connecting rod. Compression stroke pressure buildup overcomes a relief valve during a suitable portion of the compression stroke to adjust the length of the connecting rod. The connecting rod length is hydraulically locked except during the two short periods of adjustment per cycle.

3 Claims, 3 Drawing Figures

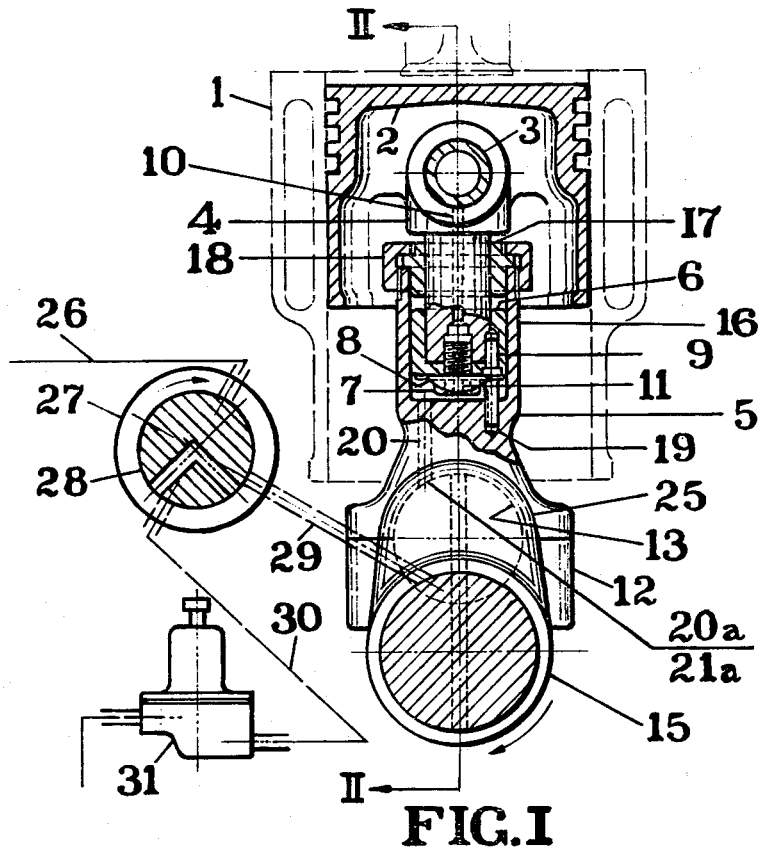
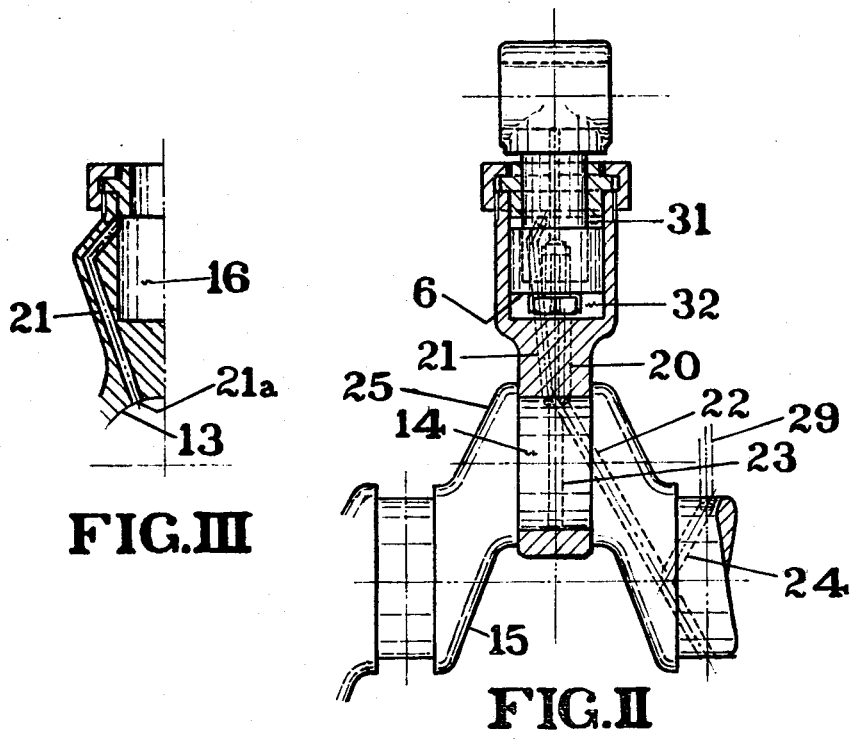
FIG.I
FIG.III
FIG.II

UNIFORM COMPRESSION PISTON ENGINE

This invention relates to internal combustion engines in which the quantity of fuel mixture entering the cylinders determine the speed and torque output.

The density of the fuel mixture entering the cylinder of an ordinary automobile engine varies widely depending on the variable conditions such as speed, torque, throttle opening and many other factors causing variation in the manifold vacuum.

If at the beginning of the compression stroke of a piston the quantity of fuel mixture trapped in the cylinder is less than atmospheric pressure, (a common condition in much of so-called city driving) it will not reach atmospheric pressure until the piston has moved some portion of the compression stroke to compensate for the negative pressure and the maximum pressure will be correspondingly reduced.

Remembering that the graph of the pressure buildup of a piston in a cylinder forms a parabolic curve, thus a small movement near the end of the compression stroke increases the pressure rapidly, thereby compensating for a much greater piston travel required to raise a low initial fuel mixture to attain atmospheric pressure. A means of decreasing the length of the connecting rod slightly, near the beginning of the compression stroke, would result in increasing the compression ratio and would compensate for a low initial fuel mixture pressure.

A means of decreasing the length of the connecting rod slightly near the end of the compression stroke, when the compression of the fuel mixture reaches a desireable compression pressure would return the compression ratio to normal when the fuel mixture at the beginning of the compression stroke was at atmospheric pressure.

It is an object of this invention to reduce the air pollutants emitted from the exhaust of throttle controlled engines by producing more complete combustion of fuel mixture under high vacuum intake manifold conditions.

A further object is to reduce the fuel consumption in city driving and simplify carburetion of the fuel.

These and other objects will be evident upon study of the following specification and accompanying drawing wherein:

FIG. I, is a partial sectional transverse view of the essential parts pertaining to each cylinder of an internal combustion engine equipped with an automatically adjustable length connecting rod and accessories:

FIG. II, is a partial cross sectional view taken along the line II—II of Figure one:

FIG. III, is a fragmentary sectional view showing the connecting rod piston oil by-passage.

According to this invention a constant compression piston engine and with reference to the drawing showing, in dashed lines, the outline of an engine cylinder 1, FIG. I, and a section of an engine piston 2, and a wrist pin 3, as an oscillating journal with piston rod 4, of length adjusting connecting rod 5, and connecting rod piston 6. Piston 6, is secured to said rod 4, by tap screw 7, locking washer 8, and alligning guide pin 9. Said piston rod 4, and said screw 7, having fluid passages 10, and 11, respectively for lubricating said wrist pin 3. Said connecting rod 5, and bearing cap 12, form a bearing 13, on crankshaft connecting rod journal 14, FIG. II, of crankshaft 15.

The opposite end of said connecting rod 5, FIG. I, from said cap 12, forms a cylinder 16, to accomodate said piston 6, and piston rod guide bushing 17, secured to said cylinder 16, by a piston guide cap 18. Aligning guide pin hole 19, slidably accommodating said guide pin 9, prevents misalignment of said wrist pin 3, with said crankshaft 15. An oil passage misalignment of said wrist pin 3, with said crankshaft 15. An oil passage 20, from said bearing 13, to said cylinder 16, and piston by-passage 21, FIG. III, are located so as to reach cut-off with crankshaft passages 22 and 23, FIG. II, at location 20A and 21A, FIG. I, prior to the angle of maxium ignition advance of crank 25, of said crankshaft 15, before the top dead center of said crank 25.

The oil cut-off at the end of the intake stroke will occur somewhat after the bottom dead center of said crank 25, on account of the offset of said passages 20 and 21, from the centerline of said connecting rod 5, but before there is even a slight pressure build-up from the compression of the fuel mixture.

Engine lubrication oil pump (not shown) supplies oil under pressure to passage 26, FIG. I, of distributor 27, said distributor 27, having a rotor 28, driven at one half said crankshaft 15, speed, is syncronized to deliver oil under pressure to passage 29, conforming to the timing of said oil passages 20, FIG. I, and 21, FIG. III, with said crankshaft passages 22, 23 and 24, FIG. II, during a latter portion of the intake stroke of said piston 1, FIG. I.

During the latter portion of the compression stroke when said passage 29, is again conforming with the timing of said passages 20, 21, 22, 23 and 24, FIG. II, said rotor 28, FIG. I, conforms with passages 29 and 30, to pressure relief valve 31, returning excess oil to oil sump (not shown).

SEQUENCE OF OPERATION

During the power and exhaust strokes and until nearly the end of the intake stroke of engine piston 2, FIG. I, the length of the connecting rod 5, has been hydraulically locked by closed ports of distributor 27.

Near the end of the intake stroke of said piston 2 pressurized lubricating oil is admitted to the connecting rod cylinder 16, both in space 32, FIG. II, above connecting rod piston 6, and space 33, below said piston 6. Said space 33, having greater piston area than said space 32, the said connecting rod 5, will be lengthened and hydraulically locked when oil cut-off occurs.

The density of the fuel mixture will vary widely under normal operating conditions at the beginning of the compression stroke of piston 2, FIG. I, and will reflect these differences when said piston 2, reaches a suitable segment near the end of the compression stroke when all fluid passages from cylinder 16, are ported to relief valve 31. The predetermined opening pressure setting of said relief valve 31, will resist the pressure buildup in the supporting column of fluid from the connecting rod cylinder 16, in space 33, FIG. II, under connecting rod piston 6, to said relief valve 31, FIG. I, to support and maintain the desired compression pressure above said piston 2, from opening to the point of cutoff of said passages 20, 21, FIG. II, at location 20a, 21a, FIG. I.

If the desired compression pressure above said piston 2, is not attained before the port cutoff of said passages 20, 21, FIG. II, at 20a, 21a, FIG. I, connecting rod 5, will retain its maximum length, increasing compression pressure to the point of ignition of the fuel mixture.

If the desired compression pressure above said piston 2, FIG. I, is exceeded before the port cutoff of passages 20, 21, FIG. II, at 20a, 21a, FIG. I, said relief valve 31, will pass sufficient oil to the engine sump (not shown) to maintain the desired compression pressure above said piston 2, at the point of cutoff of said passages 20, 21, FIG. II, at location 20a, 21a, FIG. I, and substantially at the point of ignition of the fuel mixture.

Having described my invention I claim:

1. In an internal combustion variable speed and torque throttle controlled engine, an automatic means of maintaining substantially uniform compression of the fuel mixture each compression stroke, under varying operating conditions, accomplished by means of a variable length connecting rod automatically adjusting the compression ratio; said connecting rod being composed of two major parts, one major part forming a connecting rod bearing and having a hydraulic cylinder, the other major part forming a wrist pin bearing and having a piston guided and contained in said hydraulic cylinder, both major parts having passages for lubrication and operation of said piston in said cylinder; a source of pressurized lubricating oil; a lubricating oil distributor, driven at one half crankshaft speed, arranged and synchronized to deliver pressurized oil to said crankshaft and said cylinder in said connecting rod, for lengthening said connecting rod prior to the compression stroke of engine piston; said passages arranged to allow discharge of oil from said cylinder through a pressure relief valve near the end of the compression stroke of said engine piston.

2. In an internal combustion engine as set fourth in claim 1, whereby lubricating oil distributor rotor is an intigral part of the camshaft of engine.

3. In an internal combustion variable speed and torque throttle controlled engine, an automatic means of maintaining substantially uniform compression of the fuel mixture each compression stroke, under varying operating conditions, accomplished by means of a variable length connecting rod automatically adjusting the compression ratio; said connecting rod being composed of two major parts, one major part forming a connecting rod bearing and having a hydraulic cylinder, the other major part forming a wrist pin bearing and having a piston guided and contained in said hydraulic cylinder, both major parts having passages for lubrication and operation of said piston in said cylinder; a source of pressurized lubricating oil; a lubricating oil distributor, driven at one half crankshaft speed, arranged and synchronized to deliver pressurized oil to said crankshaft and said cylinder in said connecting rod, for lengthening said connecting rod prior to the compression stroke of engine piston; said passages arranged to allow discharge of oil from said cylinder through a pressure relief valve near the end of the compression stroke of said engine piston, where by; compression pressure build-up above said engine piston is limited by said pressure relief valve, reducing the volume of oil supporting said engine piston and adjusting the length of said connecting rod; thus producing uniform compression pressure, at the point of oil passage cut-off, each successive compression stroke.

* * * * *